United States Patent
Iyer (10) Patent No.: US 10,761,841 B2
(45) Date of Patent: Sep. 1, 2020

(54) SYSTEMS AND METHODS FOR IDENTIFYING SOURCE CODE FROM BINARIES USING MACHINE LEARNING

(71) Applicant: Denso International America, Inc., Southfield, MI (US)

(72) Inventor: Gopalakrishnan Iyer, Santa Clara, CA (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/162,768

(22) Filed: Oct. 17, 2018

(65) Prior Publication Data

US 2020/0125360 A1 Apr. 23, 2020

(51) Int. Cl.
G06F 9/44 (2018.01)
G06F 8/74 (2018.01)
G06N 20/00 (2019.01)
G06F 8/75 (2018.01)
G06K 9/62 (2006.01)

(52) U.S. Cl.
CPC .................. *G06F 8/74* (2013.01); *G06F 8/75* (2013.01); *G06K 9/6267* (2013.01); *G06N 20/00* (2019.01)

(58) Field of Classification Search
CPC ....................................................... G06F 8/74
USPC ........................................................ 717/105
See application file for complete search history.

(56) References Cited

U.S. PATENT DOCUMENTS

| | | |
|---|---|---|
| 5,021,820 A | 6/1991 | Robison et al. |
| 5,067,073 A | 11/1991 | Andrews |
| 5,515,081 A | 5/1996 | Vasilik |
| 5,579,520 A | 11/1996 | Bennett |
| 5,638,067 A | 6/1997 | Brent |
| 5,822,504 A | 10/1998 | Ishibashi et al. |
| 5,838,828 A | 11/1998 | Mizuki et al. |
| 6,069,971 A | 5/2000 | Kanno et al. |

(Continued)

FOREIGN PATENT DOCUMENTS

| | | |
|---|---|---|
| WO | 2001084456 | 11/2001 |
| WO | 2016035020 | 3/2016 |

OTHER PUBLICATIONS

Gregory Conti et al., "Automated mapping of large binary objects using primitive fragment type classification", 2010, pp. S3-S12 (Year: 2010).*

(Continued)

*Primary Examiner* — Wei Y Zhen
*Assistant Examiner* — Lanny N Ung
(74) *Attorney, Agent, or Firm* — Christopher G. Darrow; Darrow Mustafa PC (57) ABSTRACT

System, methods, and other embodiments described herein relate to an improved approach to reverse engineering binary code through the use of machine learning and image processing. In one embodiment, a method includes, in response to receiving, as an electronic input, a code segment of code that is represented in a binary format, transforming the segment into an image to visually represent the binary format of the segment. The method includes generating, as an electronic output from a classifier, a segment indicator that is based, at least in part, on the image and that specifies source code corresponding to the segment in order to reverse engineer the segment into the source code using the classifier.

20 Claims, 5 Drawing Sheets

(56) References Cited

U.S. PATENT DOCUMENTS

| | | | |
|---|---|---|---|
| 6,353,483 B1 | 3/2002 | Laverty et al. | |
| 7,873,596 B2 | 1/2011 | Pudipeddi et al. | |
| 8,681,950 B2 | 3/2014 | Vlack et al. | |
| 10,193,902 B1 * | 1/2019 | Caspi | H04L 63/1416 |
| 2002/0152212 A1 | 10/2002 | Feldman | |
| 2006/0170944 A1 | 8/2006 | Arps et al. | |
| 2007/0081096 A1 | 4/2007 | Gunnewiek et al. | |
| 2010/0274755 A1 * | 10/2010 | Stewart | G06F 8/75 706/54 |
| 2012/0013626 A1 | 1/2012 | Beijing et al. | |
| 2016/0047658 A1 | 2/2016 | Nishide et al. | |
| 2017/0185386 A1 | 6/2017 | Kanhere et al. | |
| 2018/0183815 A1 * | 6/2018 | Enfinger | G06N 20/00 |

OTHER PUBLICATIONS

Yakura et al: "Malware Analysis of Imaged Binary Samples by Convolutional Neural Network with Attention Mechanism", Proceedings of the Eighth ACM Conference on Data and Application Security and Privacy, CODASPY '18, vol. 8, Mar. 19, 2018 pp. 127-134.

* cited by examiner

SYSTEMS AND METHODS FOR IDENTIFYING SOURCE CODE FROM BINARIES USING MACHINE LEARNING

TECHNICAL FIELD

The subject matter described herein relates in general to systems and methods for identifying source code segments from binary machine code, and, more particularly, to transforming the binary code into images and using a machine learning algorithm to identify the source code from the images.

BACKGROUND

Identifying program source code from compiled machine code, i.e., binary, is a complex task. These complexities can arise because the binary representation obfuscates the original source code of the program. That is, binary machine code that is compiled from the original source code can be generated in several different ways according to implementations of a particular compiler to achieve similar functionalities, and thus directly reversing the binary into the exact original source code is generally difficult. This can be due to a lack of knowledge about the compiler that generated the binary, and, more generally, the overall complexity of the binary representation.

For example, in the context of maintaining security, it can be useful to reverse engineer a compromised binary or a binary of independent malicious code to unfold how a malicious attack compromised the program or how a particular piece of malicious code functions. However, attempting to reverse engineer binary code generally involves multiple steps that can include approximating the original source code from the binary code using imprecise tools, and then manually reconstructing the source code using the approximation as a base. This multiple step process can be tedious and often fails to provide a completely accurate reconstruction.

SUMMARY

In one embodiment, example systems and methods relate to the use of a machine learning algorithm (e.g., a deep learning neural network) to improve the identification of source code from binary code. For example, machine learning algorithms often find use in object detection and recognition because of the ability of such algorithms to identify objects such as cars, pedestrians, and other objects in visual data (e.g., camera images). Thus, the present approach leverages this ability in a unique way to identify source code from images representing binary code. The disclosed systems and methods generally function by transforming the binary code into a visual image. That is, in one approach, a system generates an image that is representative of the binary code by using the bits of the binary code to encode values for pixels within the image. The resulting image provides a visual representation of the binary code.

As such, a classifier is implemented using a selected machine learning algorithm that is, for example, initially trained using sample images of binary code that are labeled with the source code segment or at least a label identifying a code class of the source code segment. Thus, the classifier develops an internal understanding of correlations between the binary encoded images and the source code segment, such that when the system subsequently processes such an image, the classifier can identify the corresponding source code segment. In this way, the disclosed systems and methods improve on the process of reverse engineering binary machine code by leveraging the abilities of machine learning algorithms to recognize patterns in visual data.

In one embodiment, a classifier system for identifying source code from program binaries is disclosed. The classifier system includes one or more processors and a memory that is communicably coupled to the one or more processors. The memory stores an image module including instructions that when executed by the one or more processors cause the one or more processors to, in response to receiving, as an electronic input, a segment of code that is represented in a binary format, transform the segment into an image to visually represent the binary format of the segment. The memory stores a recognition module including instructions that when executed by the one or more processors cause the one or more processors to generate, as an electronic output from a classifier, a segment indicator that is based, at least in part, on the image and that specifies source code corresponding to the segment in order to reverse engineer the segment into the source code using the classifier.

In one embodiment, a non-transitory computer-readable medium is disclosed. The computer-readable medium stores instructions that when executed by one or more processors cause the one or more processors to perform the disclosed functions. The instructions include instructions to, in response to receiving, as an electronic input, a segment of code that is represented in a binary format, transform the segment into an image to visually represent the binary format of the segment. The instructions include instructions to generate, as an electronic output from a classifier, a segment indicator that is based, at least in part, on the image and that specifies source code corresponding to the segment in order to reverse engineer the segment into the source code using the classifier.

In one embodiment, a method of identifying source code from program binaries is disclosed. The method includes, in response to receiving, as an electronic input, a segment of code that is represented in a binary format, transforming the segment into an image to visually represent the binary format of the segment. The method includes generate, as an electronic output from a classifier, a segment indicator that is based, at least in part, on the image and that specifies source code corresponding to the segment in order to reverse engineer the segment into the source code using the classifier.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with binary code analysis to recover source code are disclosed. As previously indicated, in various approaches, the recovery of source code from binary machine code (i.e., reverse engineering) is a task that relies on imprecise tools along with manual efforts to reconstruct the original source code. Accordingly, such approaches are generally inaccurate, and thus may have limited uses because of the lack of accuracy.

Therefore, in one embodiment, the present disclosure discusses a classifier system that leverages the pattern recognition abilities of machine learning algorithms to improve recovery of source code from binary code. For example, machine learning algorithms are generally capable of different tasks depending on a particular algorithm and a manner in which the algorithm is implemented. As one example, machine learning algorithms can be used to detect/identify objects such as cars, pedestrians, and other objects in visual data (e.g., images and video). However, binary code is generally not represented in such a visual format but is instead simply comprised of zeros and ones that represent underlying opcodes, data, memory addresses, and so on.

Therefore, the disclosed classifier system initially transforms the binary code into an image in order to produce visual data that is representative of the binary code and that a machine learning algorithm can process. For example, in one aspect, the classifier system encodes a bitmap using bits of the binary code as values for pixels within the bitmap. A resulting bitmap image is generally not identifiable by a human eye as being a particular object or segment of code. That is, depending on the particular bitmap encoding, the resulting bitmap image may appear as, for example, static or "snow" in an abstracted image. However, the classifier system trains a classifier (i.e., selected machine learning algorithm) to recognize the source code from the images encoded with the binary code. Thus, when the classifier system executes the classifier over the image encoded with the binary code, the resulting electronic output is a segment indicator that specifies at least a code class label for the source code. In further aspects, the classifier system generates the segment indicator with greater specificity and comprises identifiers for functions, input and output parameters, particular statements within the functions, and so on. In general, the classifier can be trained to varying levels of specificity depending on a particular use. Accordingly, the disclosed classifier system improves the accuracy of reverse engineering binary code into source code through the use of a combination of machine learning and image processing. In this way, malicious code that is injected into source code and separate standalone malicious code can be better identified, analyzed, and countered to improve the overall security of various electronic systems.

Figure 1:
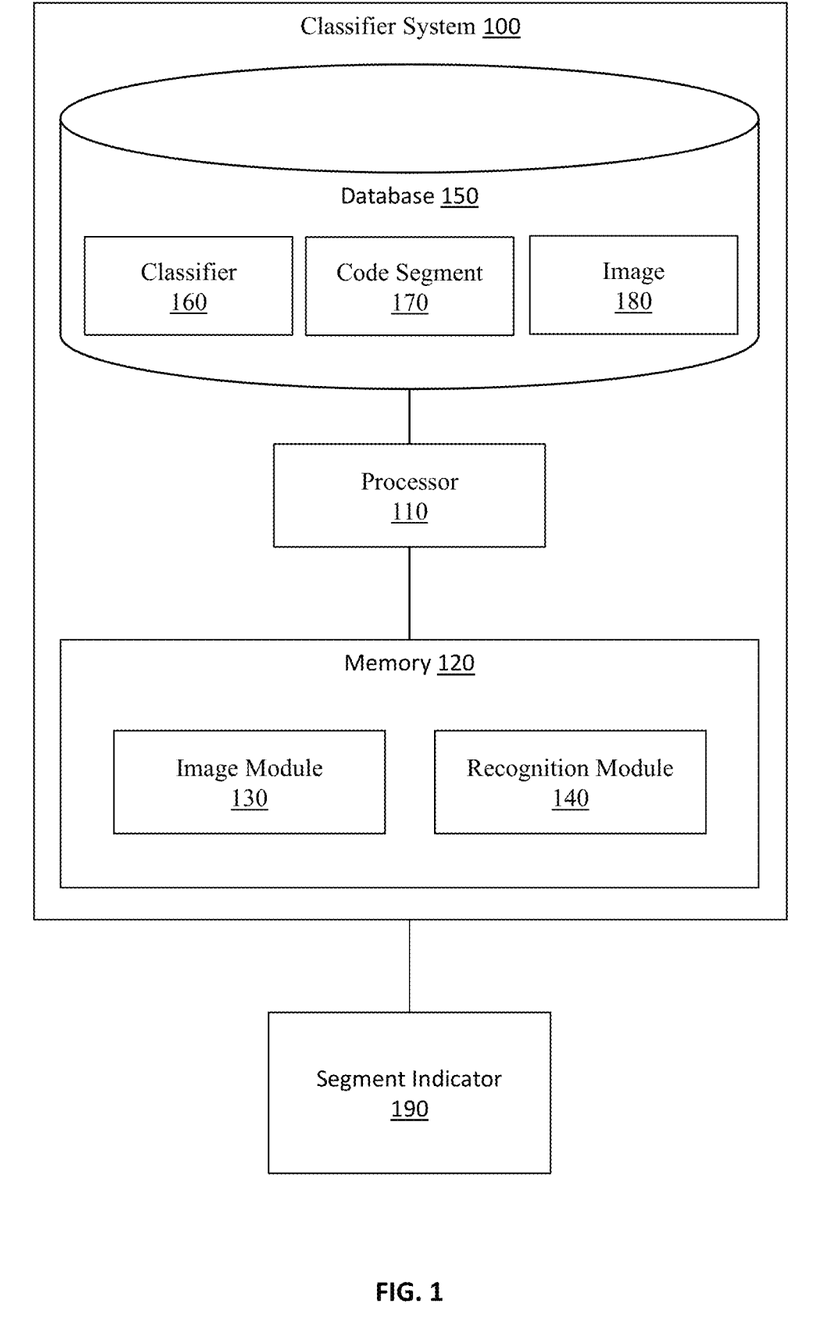
FIG. 1 illustrates one embodiment of a classifier system that is associated with reverse engineering segments of binary code.

Referring to FIG. 1, one embodiment of a classifier system 100 is illustrated. While arrangements will be described herein with respect to the classifier system 100, it will be understood that embodiments are not limited to a unitary system as illustrated. In some implementations, the classifier system 100 may be embodied as a cloud-computing system, a cluster-computing system, a distributed computing system, a software-as-a-service (SaaS) system, a standalone system, and so on. Accordingly, the classifier system 100 is illustrated and discussed as a single device for purposes of discussion but should not be interpreted to limit the overall possible configurations in which the disclosed components may be configured. For example, the separate modules, memories, databases, and so on may be distributed among various computing systems in varying combinations or embodied within a single standalone system.

The classifier system 100 also includes various elements. It will be understood that in various embodiments it may not be necessary for the classifier system 100 to have all of the elements shown in FIG. 1. The classifier system 100 can have any combination of the various elements shown in FIG. 1. Further, the classifier system 100 can have additional elements to those shown in FIG. 1. In some arrangements, the classifier system 100 may be implemented without one or more of the elements shown in FIG. 1. Further, while the various elements are shown as being located within the classifier system 100 in FIG. 1, it will be understood that one or more of these elements can be located external to the classifier system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the classifier system 100 is implemented to perform methods and other functions as disclosed herein relating to identifying source code that corresponds with binary machine code using a classifier 160. The noted functions and methods will become more apparent with a further discussion of the figures. The classifier system 100 is shown as including a processor 110. Thus, in various implementations, the processor 110 may be a part of the classifier system 100, the classifier system 100 may access the processor 110 through a data bus or another communication pathway, the processor 110 may be a remote computing resource accessible by the classifier system 100, and so on. In either case, the processor 100 is an electronic device such as a microprocessor, an ASIC, a GPU (Graphics Processing Unit) or other computing component that is capable of executing computer-readable instructions to produce various electronic outputs therefrom that may be used to control or cause the control of other electronic devices.

In one embodiment, the classifier system 100 includes a memory 120 that stores an image module 130, and a recognition module 140. The memory 120 is a random-access memory (RAM), read-only memory (ROM), a hard-disk drive, a flash memory, or other suitable memory for storing the modules 130, and 140. The modules 130, and 140 are, for example, computer-readable instructions that when executed by the processor 110 cause the processor 110 to perform the various functions disclosed herein. In various embodiments, the modules 130, and 140 can be implemented in different forms that can include but are not limited to hardware logic, an ASIC, components of the processor 110, instructions embedded within an electronic memory, and so on.

With continued reference to the classifier system 100, in one embodiment, the system 100 includes a database 150. The database 150 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 150 stores data used by the modules 130 and 140 in executing various determinations.

In one embodiment, the database 150 stores the classifier 160. In further embodiments, the classifier system 100 stores the classifier 160 in the memory 120, a specialized data structure, a cache memory, or another suitable data storage component. In still further embodiments, the classifier 160 is implemented as part of the recognition module 140.

Continuing with the database 150, in one embodiment, the database 150 also stores one or more code segments 170 of binary machine code. In general, the classifier system 100 receives the code segment(s) 170 via an electronic request over a communication pathway that is a network communication pathway (e.g., Ethernet), a wireless communication pathway, an internal hardware bus, or another suitable mechanism for acquiring the code segment 170. In either case, the code segment 170 itself is generally a compiled program or portion thereof that is represented in machine code. The phrase "machine code" as used herein generally refers to a program or portion thereof that is represented in machine language instructions that can be, for example, executed by a microprocessor such as the processor 110. Moreover, the machine code is generally understood to be a primitive or hardware-dependent language that is comprised of opcodes defined by an instruction set implemented by associated hardware. Furthermore, the machine code itself is further comprised of data values, register addresses, memory addresses, and so on.

Accordingly, continuing with the disclosed approach to identify source code from program binaries, the image module 130, in one embodiment, includes computer-readable instructions that when executed by the processor 110, cause the processor to transform a segment of binary code into an image. In various approaches, the particular form of the image may vary; however, it should be appreciated, that in general the image module 130 uses bits of the binary code as values for the image 180.

Thus, by way of example, the image module 130 receives the code segment 170 as an electronic request to reverse engineer the code segment into associated source code. In various embodiments, the request also includes one or more additional parameters for controlling options associated with performing the disclosed process such as, for example, desired accuracy, level of specificity, desired image encoding, and so on.

Accordingly, the image module 130 encodes the image 180 using successive bits from the segment 170 as values for pixels of the image 180. In various approaches, the particular manner in which the image module 130 assigns the bits of the segment to the image 180 may vary according to, for example, the type of image being encoded (e.g., bitmap, jpeg, gif, png, tiff, etc.), whether the image 180 is provided in color or black/white, dimensions of the image 180, and so on. Moreover, the image module 130, in various aspects, can encode the pixels of the image 180 from left-to-right, right-to-left, and so on. Whichever approach the image module 130 is implemented to perform, the image module 130 encodes the image 180 consistently across different code segments 170.

Thus, in one approach, the image module 130 uses 2-bits of the segment 170 per pixel to encode the image 180, which is, for example, a black and white bitmap. Alternatively, the image module 130 uses 8-bits, 12-bits, 16-bits or whichever number of bits that correlate with encoding for separate pixels of the image 180. Thus, the image module 130 may encode the image 180 according to different standards depending on a standard for a type of the image 180. In either case, the image module 130 implements a consistent encoding mechanism across separate images in order to ensure accurate training and subsequent use of the classifier 160.

Figure 2:
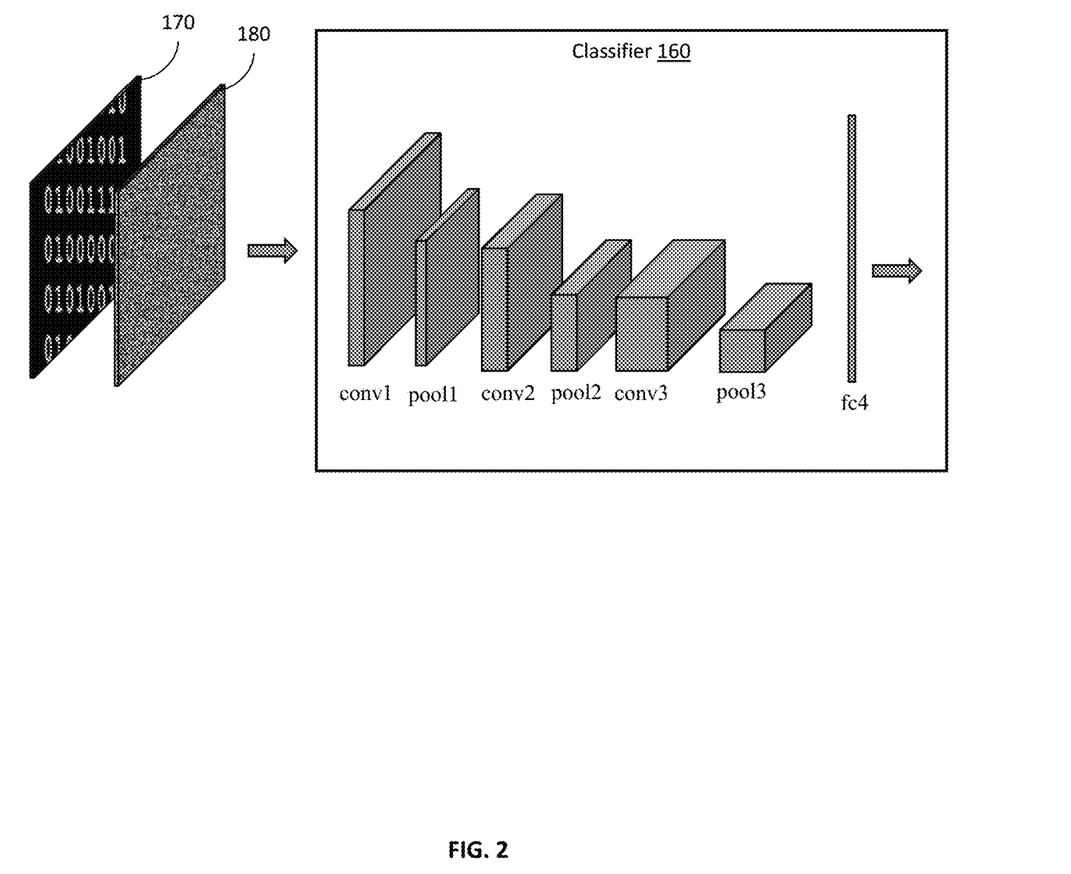
FIG. 2 illustrates one embodiment of a classifier as implemented by the disclosed classifier system.

Accordingly, the image module 130, upon transforming/translating the segment 170 into a visual representation embodied by the image 180, provides the image 180 to the recognition module 140. The recognition module 140, in one embodiment, includes computer-readable instructions that when executed by the processor 110, cause the processor to analyze the image 180 using the classifier 160 to generate the segment indicator(s) 190. As an explanation of the classifier 160, briefly consider FIG. 2. FIG. 2 illustrates one embodiment of the classifier 160. As shown in FIG. 2, the segment 170 of binary machine code is translated into the image 180 and then provided into the classifier 160.

In general, the classifier 160 is a machine learning algorithm that includes internal program and data structures designed to interpret inputs and generate electronic outputs according to a training of the classifier algorithm. The particular aspects of training the classifier 160 will be discussed subsequently, however, it should be appreciated that the classifier 160 can generally embody a machine learning algorithm that is designed to recognize patterns within visual data. For example, the classifier 160 is a deep learning neural network such as a convolutional neural network (CNN), recurrent neural network (RNN), self-organizing map, feedforward neural network, or other suitable machine vision algorithm that can recognize patterns within the provided images to associate the input code segment 170 with associated source code. As illustrated, the classifier 160 includes several different layers that are comprised of convolutional layers that convolve the input over a particular filter, pooling layers that down-sample determinations from prior layers, and fully connected layers that generate classification scores for the processed information. The classifier 160 can be implemented with varying numbers and types of layers but functions overall to classify aspects of the image 180 that are provided as input. Moreover, the illustrated example architecture of the classifier 160 is provided as an illustrative example. It should be appreciated that the classifier 160 may be implemented using different machine learning algorithms and configurations of those algorithms that vary from the illustrated example. For example, the classifier 160, in further embodiments, also includes activation layers (e.g., ReLU, tanH, etc.), dropout layers interspersed with the convolution layers, spatial pooling layers, and so on.

Accordingly, upon processing the image 180 using the classifier 160, the recognition module 140 provides one or more segment indicators 190 as an electronic output. The recognition module 140 generates the segment indicators 140 to specify source code corresponding to the segment 170 in order to reverse engineer the binary segment 170. In various implementations, the particular character of the indicators 190 may vary; however, the indicators 190 generally include at least a label of a code class for associated functions of the segment 170 along with, for example, an indicator of a confidence interval that identifies how confident the classifier 160 is with the generated label(s) (e.g., how closely the labels conform to the segment 170).

In further aspects, the recognition module 140 trains the classifier 160 to provide a finer-granularity of specificity with regard to the content of the binary segment 170. That is, the classifier 160 can be implemented to identify the source code from the binary code segment 170 at varying degrees. In one aspect, the classifier 160 provides identifications of high-level functions without specificity to the particular classes, objects, sub-functions, and statements embodied therein. However, at the other end of the spectrum, the classifier 160 is implemented to indicate the particular structure of the different functions including specifying sub-functions, statements, data structures, variables, and so on. Accordingly, the recognition module 140 along with the classifier 160 can be implemented to provide varying levels of specificity that range from higher-level indicators of function types to reconstructing the source code statement-by-statement.

Moreover, it should be appreciated that the term "source code" as used herein generally refers to a high-level programming language from which the binary code was originally derived. That is, a component such as a compiler or an interpreter generally produces the binary code as an executable form of the source code. The source code is, for example, originally generated by a developer using functions, statements, data arguments, data structures, and other programmatic constructs that are abstracted forms of the binary code. According to policies and procedures implemented by the compiler, the compiler translates the source code into the binary machine code. As such, without knowledge of the particular policies and procedures undertaken by a particular compiler, reversing the binary code into the source code is generally impractical as previously discussed. Accordingly, the presently disclosed classifier system 100 overcomes the noted difficulties by leveraging the pattern recognition abilities of machine learning algorithms to correlate the visually represented binary code back to the source code. In this way, the classifier system 100 improves the process of reverse engineering binary code and provides for improved security within computing systems through a better understanding of captured malicious code that was previously difficult to reverse engineer and thus understand mechanisms of action undertaken by the malicious code.

Figure 3:
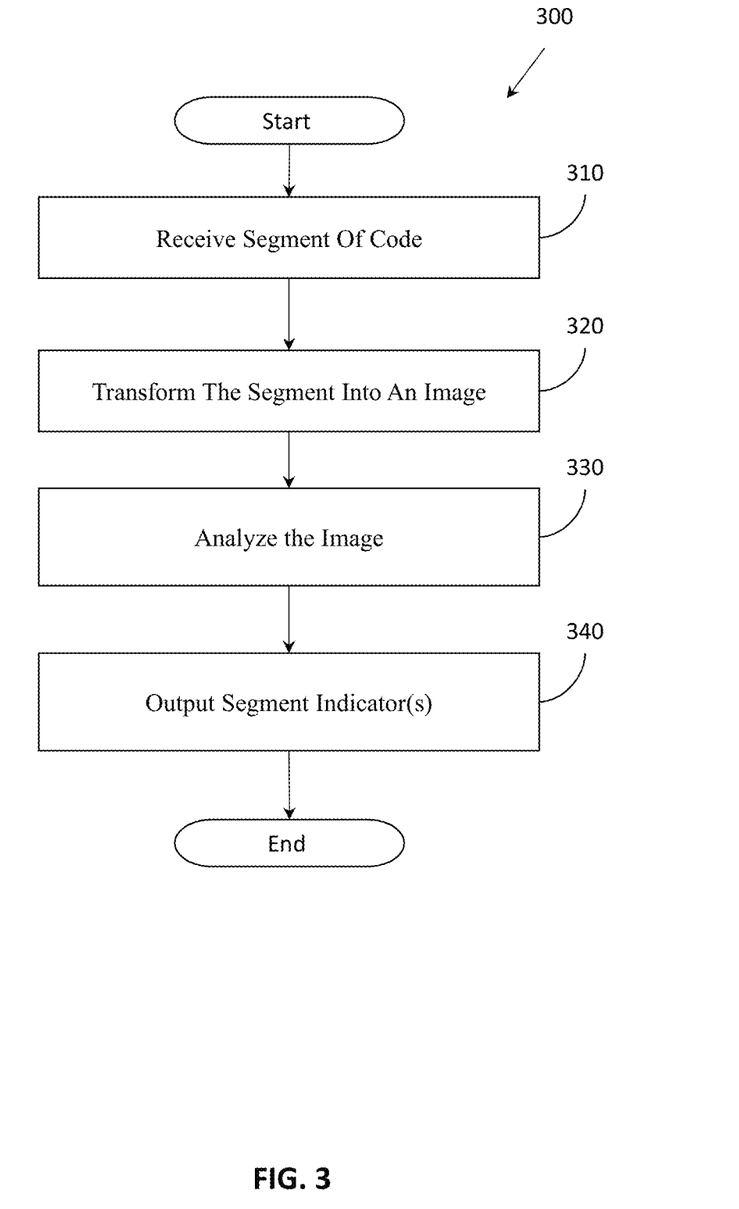
FIG. 3 illustrates one embodiment of a method that is associated with encoding images using binary code segments and identifying source code from the images.

Additional aspects of reverse engineering binary code through the use of image processing and machine learning will be discussed in relation to FIG. 3. FIG. 3 illustrates a method 300 associated with translating binary code segments into images and identifying source code therefrom. Method 300 will be discussed from the perspective of the classifier system 100 of FIG. 1. While method 300 is discussed in combination with the classifier system 100, it should be appreciated that the method 300 is not limited to being implemented within the classifier system 100 but is instead one example of a system that may implement the method 300.

At 310, the image module 130 receives a segment 170 of code that is represented in a binary format. Thus, it should be appreciated that the segment 170 is compiled from original source code that is unknown to the classifier system 100. In one embodiment, the image module 130 receives as an electronic input in an analyzing device (e.g., an electronic processing unit) and via an electronic communication such as a network communication from a providing device, a data transfer over a data bus from a storage location (e.g., database 150), or from another electronic mechanism. In either case, the segment of code is generally provided as a binary executable or portion thereof that is represented as machine code for execution by a hardware processor or similar device. Thus, in one or more arrangements, the segment 170 is formatted in a manner that is particular to an instruction set of a hardware instruction set (e.g., x86, x86_64, ARM32, ARM64, MIPS, PowerPC, etc.), which may be known as a system that is executing the segment identifies the corresponding instruction set or may be unknown adding additional complexity to reversing the segment 170. Thus, in various implementations, the classifier 160 may be specific to a particular instruction set.

At 320, the image module 130 transforms the segment 170 into an image 180 to visually represent the binary format of the segment 170. In one embodiment, the image module 130 encodes a bitmap using the segment 170 by defining values of separate pixels within the bitmap using bits of the segment 170. Of course, while a bitmap is discussed, in general, any image format with pixels that are capable of being encoded using the binary of the code segment 170 may be implemented. In general, the image module 130 encodes the image 180 to visually depict the bits of the segment 170 and thereby correlate the bits with the pixels. This direct correlation visually represents the segment 170 so that the classifier can analyze the image 180 for patterns that correspond with different source code functions, statements, and so on. As such, depending on the implementation, as previously noted, the encoding of the image 180 may be a black/white encoding, a grayscale encoding, a color encoding (e.g., 8-bit, 16-bit, etc.), or another suitable encoding that correlates the bits of the segment 170 with the pixels of the image 180.

At 330, the recognition module 140 analyzes the image 180. In one embodiment, the recognition module 140 processes the image 180 using the classifier 160. That is, the recognition module 140, for example, executes the classifier 160 using the processor 110 according to instructions of the classifier 160 and using stored data associated with the classifier 160. In various approaches, the classifier 160 may be integrated into the recognition module 140 in part or in full, or may be separately defined and retained by the classifier system 100 or stored remotely. In either case, as previously mentioned, the classifier 160 is a machine learning algorithm that has been trained to develop an internal understanding of correlations between visual representations of the binary format and associated source code. Thus, the recognition module 140 leverages the classifier 160 to recover the source code for the segment 170 without knowledge of the source code. This recognition through the visual representation of the segment 170 is possible because the classifier 160 exploits the trained internal knowledge of patterns in the image 180 that correspond with the source code to recognize the source code through identifying the patterns within the image 180 that correspond with trained/known source code.

At 340, the recognition module 140 generates, as an electronic output from the classifier 160, a segment indicator 190. In one embodiment, the segment indicator 190 specifies source code corresponding to the segment 170 in order to reverse engineer the binary into the source code. Because the source code that defines the segment 170 is obfuscated by the segment being represented in the binary format that is machine code, the binary segment 170 cannot be directly translated back into the source code. This can be because of differences in how different compilers generate the source code, intentional obfuscation through the use of misleading source code placed in the original program, and so on.

In either case, the recognition module 140 produces the segment identifier to specify, in one embodiment, at least a code class of the source code along with a confidence interval for the segment identifier. The confidence interval specifies how well the classifier 160 believes the indicator 190 matches the source code. The code class, as previously discussed, can specify simply a general type/class of functions included within the segment 170 or may specify the source code with more particularity. That is, the segment indicator 190 can vary across a spectrum of specificity depending on how the classifier 160 is initially trained. Accordingly, the indicator 190 can specify the type/class of functions within the segment 170 or may indicate with particularity individual statements, variables, data structures, and so on to the point of reconstructing the original source code. In this way, the classifier system 100 leverages image pattern recognition abilities of the classifier 160 to reverse engineer the segment 170.

Figure 4:
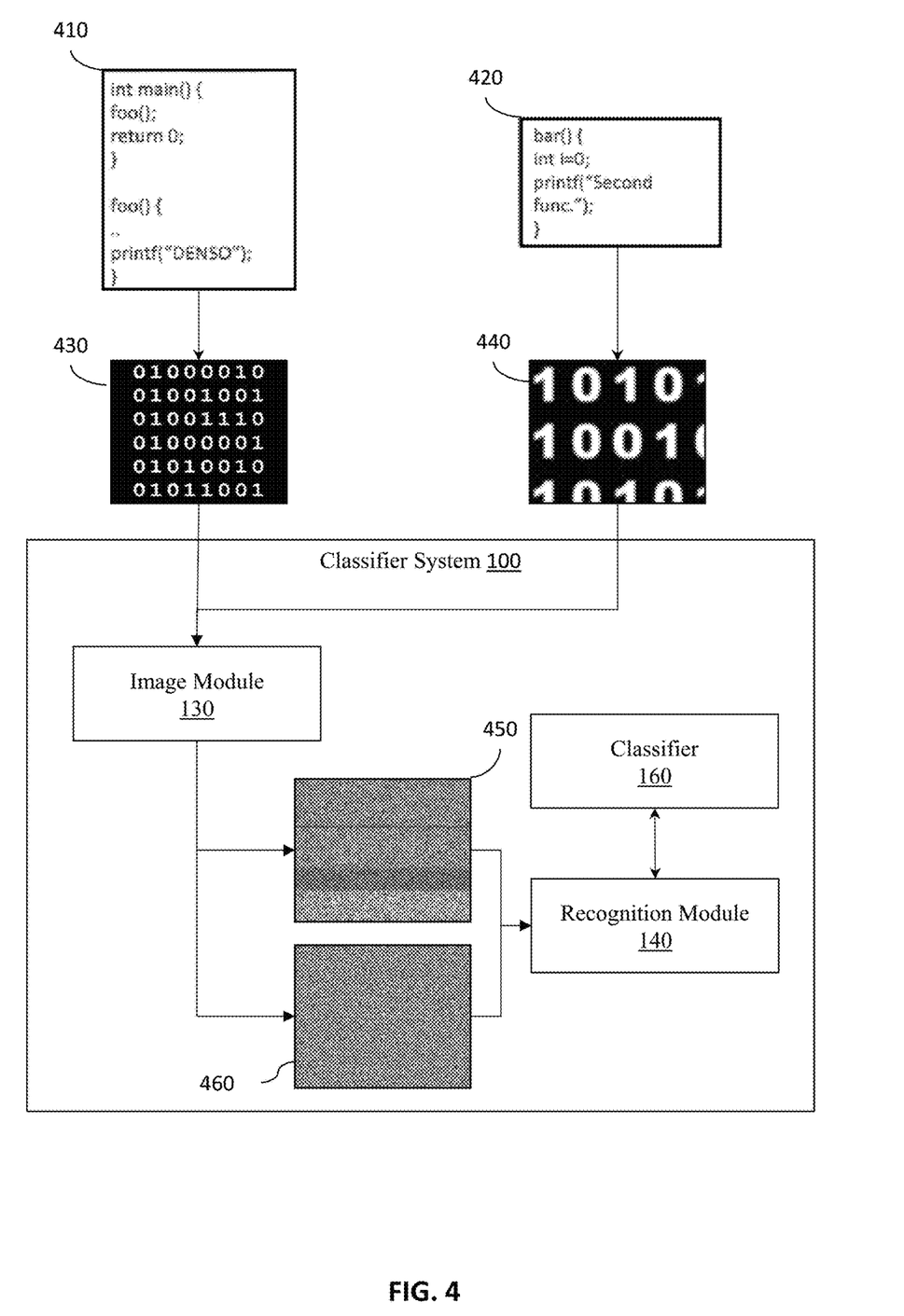
FIG. 4 illustrates one example of training the classifier system of FIG. 1.
Figure 5:
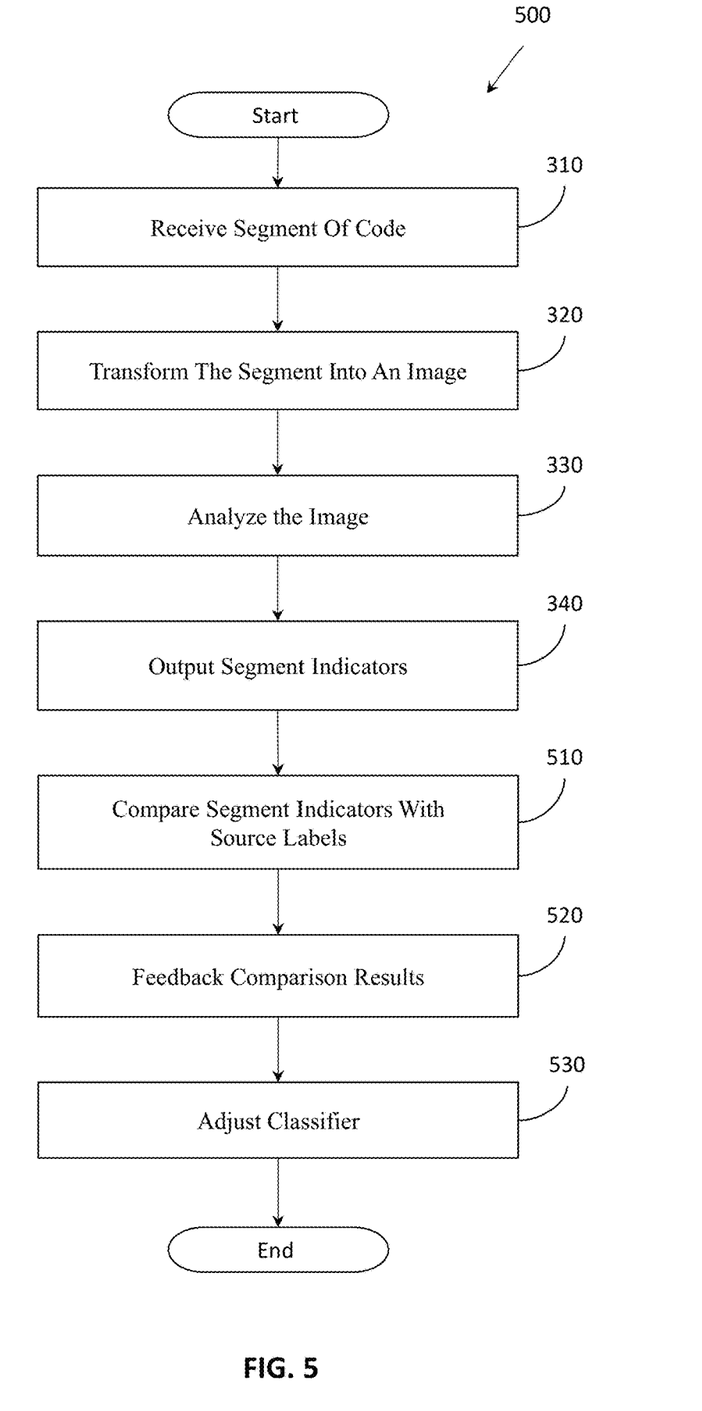
FIG. 5 illustrates a method associated with training a classifier to recognize source code from binary code represented as images.

Training of the classifier 160 will now be discussed with reference to FIGS. 4-5. FIG. 4 illustrates one example of training the classifier 160 using the original source code as labels for segments of binary code. FIG. 5 illustrates one embodiment of a method 500 that is associated with training the classifier 160. FIG. 5 is illustrated as including blocks 310-340 of FIG. 3 along with additional blocks 510, 520, and 530. It should be appreciated that the training of the classifier 160 and the use of the classifier 160 to identify segments of code are generally similar and thus share a commonality between the blocks 310-340. Accordingly, for purposes of brevity, the discussion of blocks 310-340 of method 500 will not be reiterated.

FIG. 4 illustrates source code 410 and 420. The source code 410 and 420 represent the original programming abstraction as produced by a developer. The source code 410 and 420 are illustrated for purposes of discussion, and it should be appreciated that a training data set for the classifier 160 would generally include a multiplicity of samples (e.g., at least a few thousand). Thus, the source code 410 and 420 are generally compiled into respective binaries as represented by segments 430 and 440. The segments 430 and 440 generally correspond with the segment 170, which are provided as electronic inputs into the image module 130. When training, the classifier system 100 also receives the source code 410 and 420 or at least identifying class labels associated with the source code 410 and 420 as training data for performing comparisons to check against generated results. When the training data is provided as class labels, the class labels identify portions (e.g., functions or functional blocks) of the source code 410 and 420 such as functions, classes, data structures and so on. However, when the training data includes the source code 410 and 420 itself, the source code serves as the labels for the corresponding images 450 and 460 produced from the binary segments 430 and 440.

Thus, at 510, after the recognition module 140 produces the segment indicator 190 at 340, the recognition module 140 initiates the training process by comparing the segment indicator 190 with the provided label(s) of the segments 430 and 440. As indicated, the label(s) can be an identifier of the general class of the functions and other objects or may identify the source code itself on a line-by-line basis. In either case, the recognition module 140, at 510, compares the segment indicator(s) 190 with the training labels to assess whether the segment indicator(s) 190 accurately describe the source code associated with the binary segments. As a result of the comparison, the recognition module 140 produces feedback to the classifier 160. The feedback, which is provided to the classifier 160, as discussed at 520, is, in one embodiment, a score.

In various approaches, the score can be implemented differently, however, it should be appreciated that the score indicates at least a positive or negative match. In further aspects, the feedback indicates a numerical score (e.g., a confidence associated with the match on a scale of 0-100). Moreover, the score is provided for the individual labels such that, for example, each label is separately scored. Thus, when the classifier 160 is implemented to identify separate statements, the feedback includes a score for each separate label associated with a separate statement.

Accordingly, at 520, the feedback is provided to the classifier 160. In one embodiment, the recognition module 140, and the classifier 160 implement one or more training algorithms that handle generating the feedback, providing the feedback, and adjusting the classifier 160 as discussed at 530. It should be appreciated that the particular algorithm for training the classifier 160 can take different forms depending on a particular approach (e.g., adversarial, reinforcement, inverse, etc.). Moreover, while feedback mechanisms are generally discussed, in further aspects, the implemented classifier 160 can include feedforward learning mechanism or other suitable approaches that are distinct from the noted feedback mechanisms. In either case, the recognition module 140 generally implements the training algorithm to, at 530, adjust the classifier 160 according to the feedback or other mechanism in order to learn correlations between the source code and the images.

In one embodiment, the recognition module 140 adjusts the classifier 160 by modifying internal nodal weights of the classifier 160. These adjustments vary, for example, the weighting given to various determinations by internal nodes of the classifier 160. Thus, in one approach, the results of the comparison inform a gradient decent algorithm that specifies how to adjust the weighting of the nodes. Accordingly, the recognition module 140, in one approach, adjusts the nodal weights until the weights converge on a solution that is, for example, a steady state across a defined range of inputs. In further embodiments, the classifier 160 includes hyperparameters that are, for example, "weights" or adjustment values that are self-adjusting within the classifier 160 according to differences in inputs versus outputs. Moreover, the recognition module 140, in one approach implements a learning rate that is a parameter defining how quickly the classifier 140 adapts to changes in inputs and classifications outputs according to identified errors. Thus, the learning rate may prevent large swings in nodal weights when, for example, outlier inputs are classified or other aberrations are encountered.

Additionally, it should be appreciated, that while FIG. 4 illustrates training for two separate segments of source code 410 and 420, the overall training process for the classifier 160 includes performing the method 500 for a plurality of training samples. In various approaches, the training samples employed, and, thus, the training iterations undertaken to sufficiently train the classifier 160 may be in the thousands, hundreds of thousands, or millions of samples/iterations. As a general characteristic of the training process, the more training that is undertaken, the better the internal understanding of the classifier 160 for identifying the source code from the images.

In this way, the classifier system 100 trains the classifier 160 to recognize source code associated with segments of binary code that are represented in images thereby enabling the reverse engineering of obfuscated binary code segments without manual intervention and with improved accuracy.

Additionally, it should be appreciated that the classifier system 100 from FIG. 1 can be configured in various arrangements with separate integrated circuits and/or chips. In such embodiments, the image module 130 from FIG. 1 is embodied as a separate integrated circuit. Additionally, the recognition module 140 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130 and 140 may be combined into a separate application-specific integrated circuit. In further embodiments, portions of the functionality associated with the modules 130 and 140 may be embodied as firmware executable by a processor and stored in a non-transitory memory. In still further embodiments, the modules 130 and 140 are integrated as hardware components of the processor 110.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for various implementations. The examples are not intended to be limiting. Both singular and plural forms of terms may be within the definitions.

The classifier system 100 can include one or more processors 110. In one or more arrangements, the processor(s) 110 can be a main processor of the classifier system 100. For instance, the processor(s) 110 can be an electronic control unit (ECU). The classifier system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a cache or other memory of a GPU, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic circuit (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), GPU, or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Python Go, Java™, Ruby, Objective-C, Visual Basic .NET, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A classifier system for identifying source code from program binaries, comprising:
   one or more processors;
   a memory communicably coupled to the one or more processors and storing:
   an image module including instructions that when executed by the one or more processors cause the one or more processors to, in response to receiving, as an electronic input, a segment of code that is represented in a binary format, transform the segment into an image to visually represent the binary format of the segment; and
   a recognition module including instructions that when executed by the one or more processors cause the one or more processors to analyze the image by processing the image using a classifier that is a machine learning algorithm with an internal understanding of correlations between the binary format and associated source code to recover the source code for the segment without knowledge of the source code and by analyzing the segment as a whole without decomposing the segment into subcomponents; and
   generate, as an electronic output from the classifier, a segment indicator that is based, at least in part, on the image and that specifies source code corresponding to the segment in order to reverse engineer the segment into the source code using the classifier, wherein the segment indicator identifies separate functions and statements of the source code represented in the segment.

2. The classifier system of claim 1, wherein the image module includes instructions to transform the segment into the image by encoding a bitmap using the segment by defining values of separate pixels within the bitmap using bits of the segment.

3. The classifier system of claim 1, wherein source code that defines the segment is obfuscated by the segment being represented in the binary format that is machine code, and
wherein the segment indicator specifies a code class of the source code along with a confidence interval for the code class.

4. The classifier system of claim 1, wherein the recognition module includes instructions to generate the segment indicator using the classifier to reverse engineer the segment to identify the source code that corresponds with the segment through learned correlations embodied within the classifier.

5. The classifier system of claim 1,
wherein the recognition module includes instructions to train the classifier to recognize correlations between the source code and the binary format through identifying patterns within the image that correspond with known source code.

6. The classifier system of claim 1, wherein the recognition module further includes instructions to train the classifier to recognize source code associated with segments of binary code that are represented in images by providing the classifier with feedback according to whether results produced by the classifier match defined labels that identify the source code for the segments.

7. The classifier system of claim 6, wherein the recognition module includes instructions to train the classifier including instructions to training the classifier to approximate a code class of the source code.

8. The classifier system of claim 6, wherein the recognition module includes instructions to train the classifier including instructions to train the classifier to identify the source code at, at least, a function-level that accounts for overall functionality of the segments.

9. A non-transitory computer-readable medium storing instructions for identifying source code from program binaries and that when executed by one or more processors cause the one or more processors to:
in response to receiving, as an electronic input, a segment of code that is represented in a binary format, transform the segment into an image to visually represent the binary format of the segment;
analyze the image by processing the image using a classifier that is a machine learning algorithm with an internal understanding of correlations between the binary format and associated source code to recover the source code for the segment without knowledge of the source code and by analyzing the segment as a whole without decomposing the segment into subcomponents; and
generate, as an electronic output from the classifier, a segment indicator that is based, at least in part, on the image and that specifies source code corresponding to the segment in order to reverse engineer the segment into the source code using the classifier, wherein the segment indicator identifies separate functions and statements of the source code represented in the segment.

10. The non-transitory computer-readable medium of claim 9, wherein the instructions to transform the segment into the image include instructions to encode a bitmap using the segment by defining values of separate pixels within the bitmap using bits of the segment.

11. The non-transitory computer-readable medium of claim 9, wherein source code that defines the segment is obfuscated by the segment being represented in the binary format that is machine code, and
wherein the segment indicator specifies a code class of the source code along with a confidence interval for the code class.

12. The non-transitory computer-readable medium of claim 9, wherein the instructions to generate the segment indicator include instructions to use the classifier to reverse engineer the segment by identifying the source code that corresponds with the segment through learned correlations embodied within the classifier.

13. The non-transitory computer-readable medium of claim 9,
wherein the instructions to train the classifier cause the classifier to develop correlations to recognize the source code from the binary format through identifying patterns within the image that correspond with known source code.

14. A method of identifying source code from program binaries, comprising:
in response to receiving, as an electronic input, a segment of code that is represented in a binary format, transforming the segment into an image to visually represent the binary format of the segment;
analyzing the image by processing the image using a classifier that is a machine learning algorithm with an internal understanding of correlations between the binary format and associated source code to recover the source code for the segment without knowledge of the source code and by analyzing the segment as a whole without decomposing the segment into subcomponents; and
generating, as an electronic output from the classifier, a segment indicator that is based, at least in part, on the image and that specifies source code corresponding to the segment in order to reverse engineer the segment into the source code using the classifier, wherein the segment indicator identifies separate functions and statements of the source code represented in the segment.

15. The method of claim 14, wherein transforming the segment into the image includes encoding a bitmap using the segment by defining values of separate pixels within the bitmap using bits of the segment.

16. The method of claim 14, wherein the source code that defines the segment is obfuscated by the segment being represented in the binary format that is machine code, and
wherein the segment indicator specifies a code class of the source code along with a confidence interval for the segment indicator.

17. The method of claim 14, wherein generating the segment indicator using the classifier reverse engineers the segment to identify the source code that corresponds with the segment through learned correlations embodied within the classifier.

18. The method of claim 14,
wherein the classifier recognizes correlations between the source code and the binary format through identifying patterns within the image that correspond with known source code.

19. The method of claim 14, further comprising:
training the classifier to identify original source code associated with segments of binary code that are visually represented in images by providing the classifier with feedback according to whether results produced by the classifier match defined labels that identify the original source code for the segments.

20. The method of claim 19, wherein training the classifier includes training the classifier to approximate a code class of the source code, and wherein training the classifier includes training the classifier to identify the source code at, at least, a function-level that accounts for overall functionality of the segments.

\* \* \* \* \*